United States Patent
Naganishi et al.

(10) Patent No.: US 10,381,793 B2
(45) Date of Patent: Aug. 13, 2019

(54) GROUND CONNECTION STRUCTURE

(71) Applicant: Yazaki Corporation, Minato-ku, Tokyo (JP)

(72) Inventors: Yukinari Naganishi, Kosai (JP); Akira Baba, Kosai (JP); Takashi Odajima, Kosai (JP); Hirohito Habara, Kosai (JP); Hideaki Saitoh, Kosai (JP); Takao Ota, Kosai (JP); Akihiro Koyama, Kosai (JP); Atsushi Nakata, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 1005 days.

(21) Appl. No.: 14/335,280

(22) Filed: Jul. 18, 2014

(65) Prior Publication Data

US 2014/0327303 A1    Nov. 6, 2014

Related U.S. Application Data

(63) Continuation of application No. PCT/JP2013/050718, filed on Jan. 17, 2013.

(30) Foreign Application Priority Data

Jan. 20, 2012   (JP) ................................ 2012-009739

(51) Int. Cl.
*B60L 50/50* (2019.01)
*H01R 43/00* (2006.01)
(Continued)

(52) U.S. Cl.
CPC ............. *H01R 43/00* (2013.01); *B60L 50/50* (2019.02); *H01B 5/12* (2013.01); *H01R 4/64* (2013.01);
(Continued)

(58) Field of Classification Search
CPC .......... H01R 4/64; H01R 11/32; H01R 43/00; H01R 11/12; H01R 4/029; H01R 4/304;
(Continued)

(56) References Cited

U.S. PATENT DOCUMENTS

| | | | | |
|---|---|---|---|---|
| 4,934,952 A | * | 6/1990 | Banker | ..................... H01R 4/62 |
| | | | | 228/175 |
| 5,418,330 A | * | 5/1995 | Rook | ................... H01R 9/0512 |
| | | | | 174/75 C |

(Continued)

FOREIGN PATENT DOCUMENTS

| | | |
|---|---|---|
| DE | 2052465 A1 | 5/1972 |
| JP | 50132452 A | 10/1975 |

(Continued)

OTHER PUBLICATIONS

Communication dated May 11, 2015 from the Japanese Patent Office in counterpart application No. 2013-554319.

(Continued)

*Primary Examiner* — Daniel Kessie
(74) *Attorney, Agent, or Firm* — Sughrue Mion, PLLC

(57) ABSTRACT

A ground connection structure is a structure for collectively connecting, to a body of a vehicle, a plurality of grounding wires which are connected to respective electrical components installed in the vehicle. The ground connection structure includes: a connection box to which the plurality of grounding wires are connected; a grounding terminal part connected to the vehicle in an electrically conducting state; and an electrically conducting connection part having one end connected to the connection box and the other end connected to the grounding terminal part, the electrically conducting connection part connecting the connection box and the grounding terminal part in an electrically conducting (Continued)

manner. The electrically conducting connection part is made of a low-inductance material having low inductance.

12 Claims, 14 Drawing Sheets

(51) Int. Cl.
| | |
|---|---|
| H01R 4/64 | (2006.01) |
| H01R 11/32 | (2006.01) |
| H01B 5/12 | (2006.01) |
| H01R 11/12 | (2006.01) |
| H01R 4/02 | (2006.01) |
| H01R 4/30 | (2006.01) |

(52) U.S. Cl.
CPC .............. *H01R 11/32* (2013.01); *H01R 4/029* (2013.01); *H01R 4/304* (2013.01); *H01R 11/12* (2013.01); *H01R 2201/26* (2013.01); *Y10T 29/49204* (2015.01)

(58) Field of Classification Search
CPC ....... H01R 2201/26; B60L 11/18; H01B 5/12; Y10T 29/49204
See application file for complete search history.

(56) References Cited

U.S. PATENT DOCUMENTS

| | | | | | |
|---|---|---|---|---|---|
| 5,473,117 | A * | 12/1995 | Morgan | ................. | H01R 4/646 174/74 R |
| 5,866,843 | A * | 2/1999 | Ikeda | ................. | B60R 16/0215 174/36 |
| 6,489,563 | B1 * | 12/2002 | Zhao | ................... | H01R 9/0524 174/88 C |
| 6,730,848 | B1 * | 5/2004 | Antaya | ............... | B23K 1/0008 174/78 |
| 6,981,891 | B1 * | 1/2006 | Huang | ................ | H01R 23/662 439/497 |
| 8,476,864 | B2 * | 7/2013 | Ferre Fabregas | ...... | G01R 1/203 320/104 |
| 8,525,029 | B2 * | 9/2013 | Kato | .................. | B60R 16/0215 174/113 R |
| 9,466,404 | B2 * | 10/2016 | Guthrie | .............. | B60R 16/0215 |
| 2002/0115317 | A1 * | 8/2002 | Delcourt | .................. | H01R 4/30 439/84 |
| 2002/0155738 | A1 * | 10/2002 | Ohsawa | ............... | B60Q 1/0088 439/98 |
| 2004/0259431 | A1 * | 12/2004 | Delcourt | .................. | H01R 4/30 439/766 |
| 2005/0014408 | A1 * | 1/2005 | Swiatek | ................... | B62J 99/00 439/215 |
| 2005/0162015 | A1 * | 7/2005 | Yamaguchi | ......... | B60R 16/0215 307/10.1 |
| 2005/0166882 | A1 * | 8/2005 | Suzuki | ............... | F02D 41/2451 123/143 C |
| 2006/0278423 | A1 * | 12/2006 | Ichikawa | ............ | B60R 16/0215 174/72 A |
| 2009/0314511 | A1 * | 12/2009 | Hagi | ...................... | H01R 4/726 174/78 |
| 2013/0026331 | A1 * | 1/2013 | Kodaka | ................ | H01Q 1/3275 248/534 |

FOREIGN PATENT DOCUMENTS

| | | | |
|---|---|---|---|
| JP | 6349765 | U | 4/1988 |
| JP | 4095114 | U | 8/1992 |
| JP | 05074505 | A | 3/1993 |
| JP | 6-104066 | A | 4/1994 |
| JP | 7-249464 | A | 9/1995 |
| JP | 8-294221 | A | 11/1996 |
| JP | 11241707 | A | 9/1999 |
| JP | 2004-119187 | A | 4/2004 |
| JP | 2005-93198 | A | 4/2005 |
| JP | 2005093198 | A * | 4/2005 |
| JP | 2005093198 | A * | 4/2005 |
| JP | 2010164129 | A | 7/2010 |

OTHER PUBLICATIONS

Communication dated Sep. 2, 2015 from the European Patent Office issued in corresponding application No. 13738655.3.
Communication dated Dec. 8, 2015, from the Japanese Patent Office in counterpart application No. 2013-554319.
International Search Report for PCT/JP2013/050718 dated Feb. 12, 2013 [PCT/ISA/210].
Written Opinion for PCT/JP2013/050718 dated Feb. 12, 2013 [PCT/ISA/237].

* cited by examiner

FIG. 7
(a) 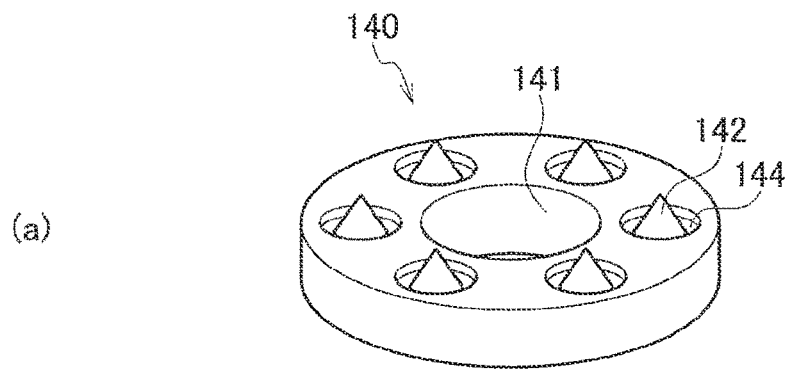
(b) 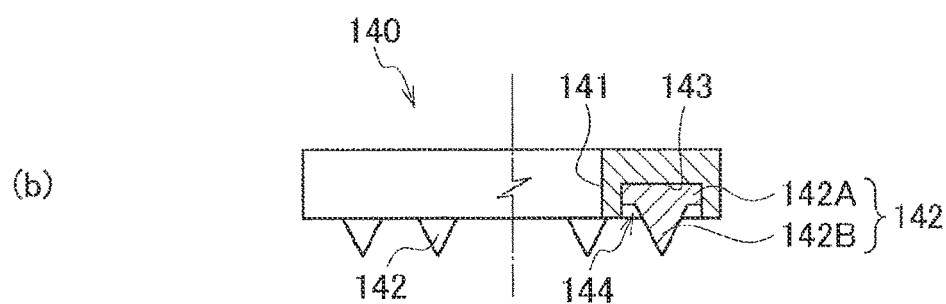
(c) 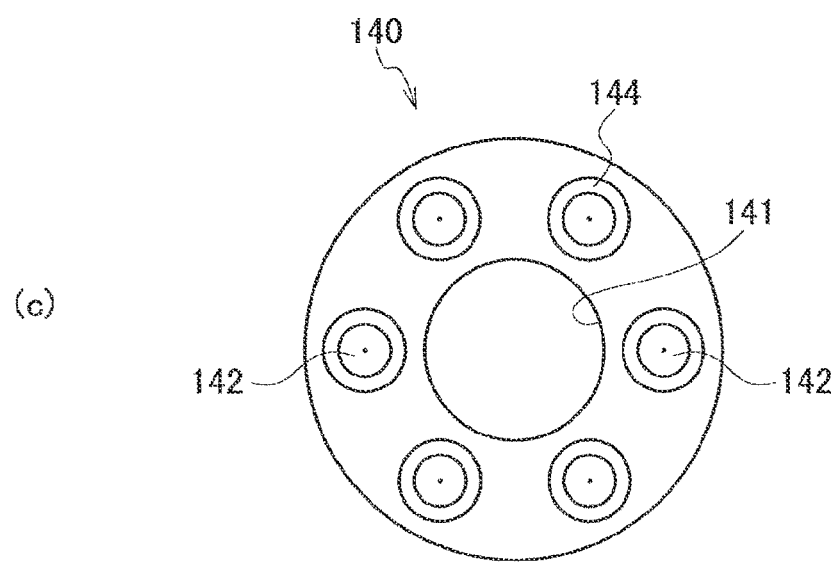

FIG. 8
(a)
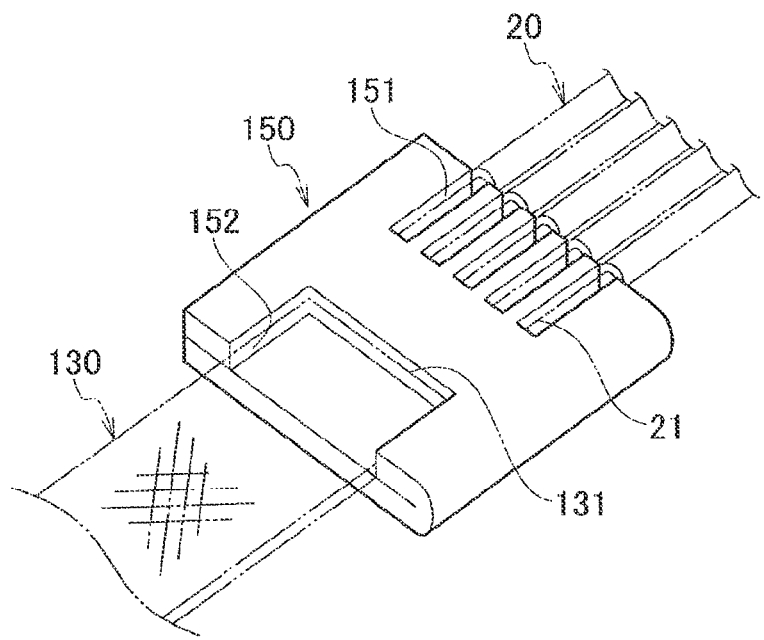
(b)
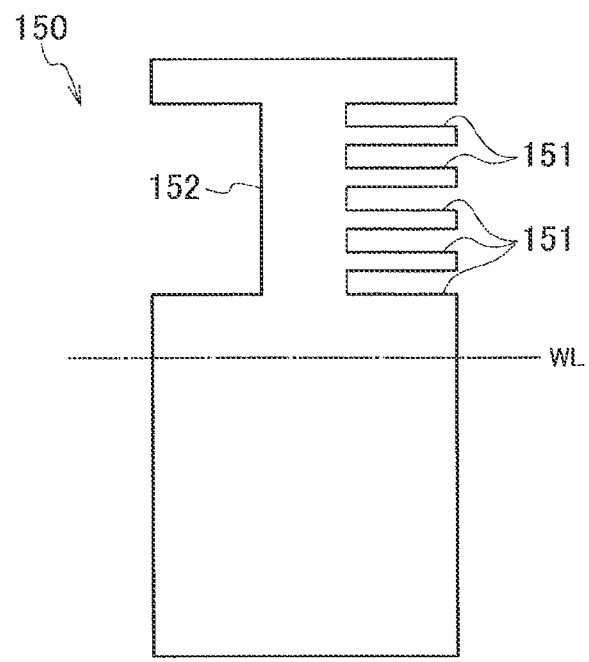

FIG. 9
(a)
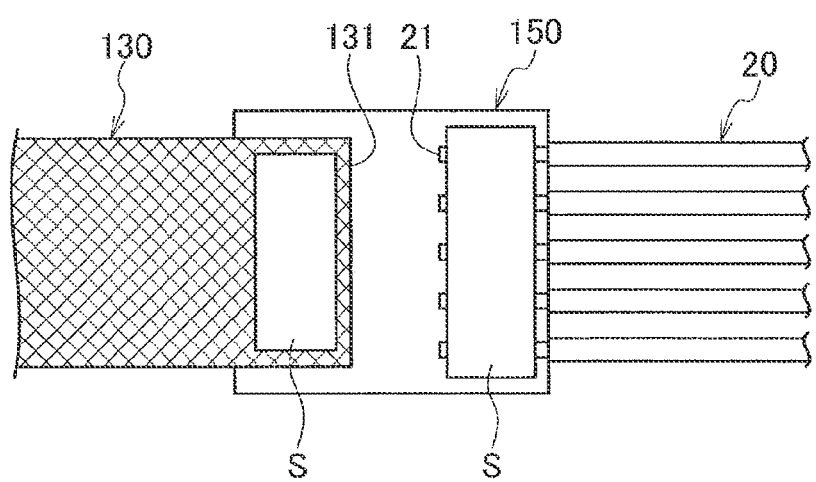
(b)
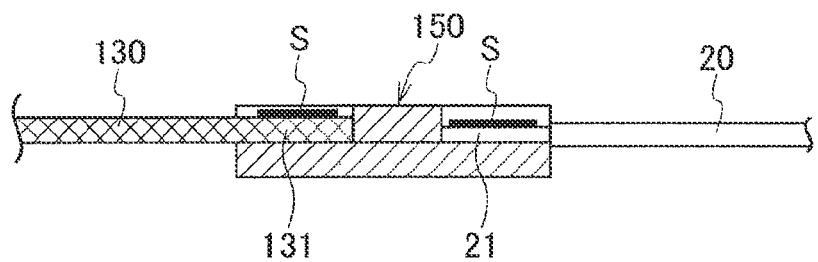

FIG. 13
(a) 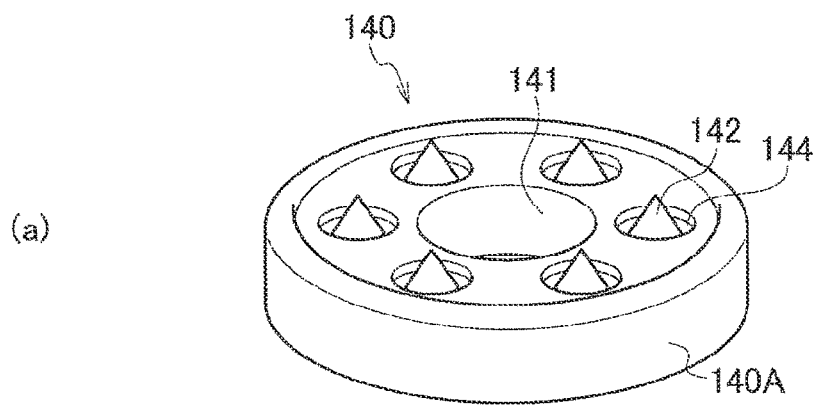
(b) 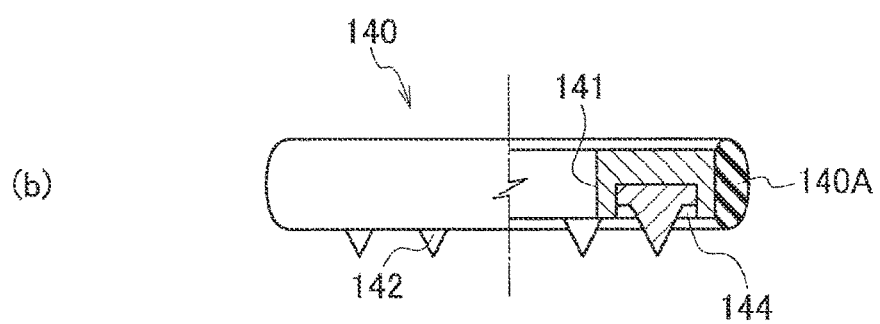
(c) 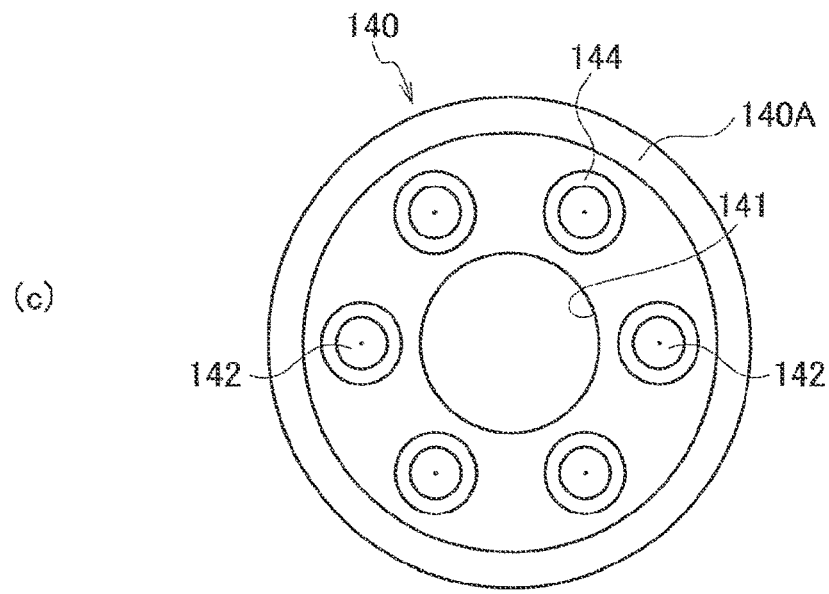

GROUND CONNECTION STRUCTURE

CROSS REFERENCE TO RELATED APPLICATIONS

This application is a Continuation of PCT Application No. PCT/JP2013/050718, filed on Jan. 17, 2013, and claims the priority of Japanese Patent Application No. 2012-009739, filed on Jan. 20, 2012, the content of both of which is incorporated herein by reference.

BACKGROUND

1. Technical Field

The present invention relates to a ground connection structure which connects a plurality of grounding wires connected to respective electrical components installed in a vehicle to a body of the vehicle in an electrically conducting state.

2. Related Art

In electrical components installed in a vehicle, such as an automobile, hitherto, there are a variety of proposals related to a ground connection structure by which a plurality of grounding wires connected to respective electrical components requiring ground connection are connected to a body of the vehicle in an electrically conducting state.

For instance, a ground connection structure is known as a first conventional example, which connects a plurality of grounding wires consisting of single-core circular wires to a plurality of connection points of a body of a vehicle directly. In the ground connection structure of the first conventional example, the plurality of connection points have to be formed in the body of the vehicle in order to connect the plurality of grounding wires to the body of the vehicle directly.

Therefore, a ground connection structure is known as the second conventional example, which connects a plurality of grounding wires consisting of single-core circular wires to a busbar in a connection box, so that a single ground terminal attached to the busbar is connected to a body of a vehicle (refer to JP H07-249464 A). In the ground connection structure of the second conventional example, it is possible to reduce the number of connecting points to be formed in the body of the vehicle since one ground terminal is connected to the body of the vehicle.

In the ground connection structure of the second conventional example, however, it is necessary to wire the plurality of grounding wires to the connecting box. Thus, the plurality of grounding wires have to be routed to the vicinity of the body of the vehicle, so that there is room for improvement with respect to the routing capability of the grounding wires.

Therefore, a ground connection structure is known as the third conventional example, which connects a plurality of grounding wires, each of which includes a single-core circular wire connected to respective electrical components, to a connection box (connected part), and which connects a grounding terminal part, which is connected to an electrically conducting connection part including a single-core circular wire for connection drawn out from the connection box, to a body of a vehicle. In the ground connection structure of the third conventional example, when the grounding wires are routed up to the connection box, the conductivity from the connection box to the body would be accomplished by routing of the electrically conducting connection part. Thus, it is possible to improve the routing capability of the electrically conducting connection part.

SUMMARY

In the ground connection structure of the third conventional example, however, the impedance of the electrically conducting connection part has not been taken account although the routing capability of the electrically conducting connection part can be improved. In the ground connection structure of the third conventional example, that is, the single-core circular wire as the electrically conducting connection part has a diameter established by a current capacity based on the number of grounding wires connected to the connection box, the line thickness of the grounding wire, etc. Consequently, the noise voltage is elevated due to the action of a potential drop produced at the electrically conducting connection part, so that the resulting potential rise would cause noise.

Under such a situation, an object of the present invention is to provide a ground connection structure capable of suppressing noise derived from a potential rise while ensuring the routing capability of an electrically conducting connection part, and also a method of manufacturing the ground connection structure.

In order to solve the above-mentioned problem, a ground connection structure according to an aspect of the present invention includes: a connected part to which a plurality of grounding wires are connected, the grounding wires being respectively connected to a plurality of electrical components installed in a vehicle; a grounding terminal part connected to a body of the vehicle in an electrically conducting state; and an electrically conducting connection part having one end connected to the connected part and the other end connected to the grounding terminal part to connect the connected part and the grounding terminal part in an electrically conducting manner. The electrically conducting connection part is made of a low-inductance material having low inductance.

As the electrically conducting connection part is formed by the low-inductance material, it is possible to reduce the impedance of the electrically conducting connection part. Especially, it is possible to realize low impedance against high-frequency alternating current component. As the low-impedance electrically conducting connection part reduces significantly possibility of potential drop, it is possible to suppress a rising of noise voltage caused by such potential drop, allowing a prevention of noise resulting from such potential rise. As a result, it is possible to prevent noise from having adverse impacts on electrical components installed in a vehicle (i.e. causing the components to be operated unstably or non-functionally).

Additionally, the electrically conducting connection part is provided to connect the connected part and the grounding terminal part in an electrically conducting manner. Thus, if only the grounding wires are routed up to the connected part, the conductivity from the connected part to the body would be accomplished by routing of the electrically conducting connection part only and accordingly, it is possible to ensure the routing capability of the electrically conducting connection part.

It is preferable that the low-inductance material is flat-shaped in cross section perpendicular to an extending direction of the low-inductance material.

Consequently, when comparing with a case of using a single-core circular wire having a circular-shaped cross section, it is possible to reduce inductance of the electrically conducting connection part, making the impedance smaller. Thus, it is possible to realize low impedance for high-frequency alternating current component particularly.

It is preferable that the low-inductance material is formed by a flat braided wire.

Consequently, due to its superior flexibility, it is possible to improve the routing capability of the electrically conducting connection part.

The low-inductance material may be covered with a covering member made of resin.

Consequently, the low-inductance material can be protected from its deterioration and it is possible to prevent the deterioration of the low-inductance material. For this reason, it is possible to improve the durability the low-inductance material. Also, the covering member has the function of holding the configuration of the low-inductance material in a flat shape.

In accordance with the aspect of the present invention, it is possible to provide the ground connection structure capable of suppressing noise derived from a potential rise while ensuring the routing capability of the electrically conducting connection part.

BRIEF DESCRIPTION OF DRAWINGS

FIG. 7(a) is a perspective view illustrating a washer according to the second embodiment, FIG. 7(b) is a side view illustrating the washer according to the second embodiment, and FIG. 7(c) is a plan view illustrating the washer according to the second embodiment.

FIG. 8(a) is a perspective view illustrating a connection fitting according to the second embodiment, and FIG. 8(b) is a development view illustrating the connection fitting according to the second embodiment.

FIG. 9(a) is a plan view illustrating the connection fitting according to the second embodiment, and FIG. 9(b) is a sectional view illustrating the connection fitting according to the second embodiment.

FIG. 13(a) is a perspective view illustrating a washer according to the third embodiment, FIG. 13(b) is a side view illustrating the washer according to the third embodiment, and FIG. 13(c) is a plan view illustrating the washer according to the third embodiment.

DETAILED DESCRIPTION

Figure 1:
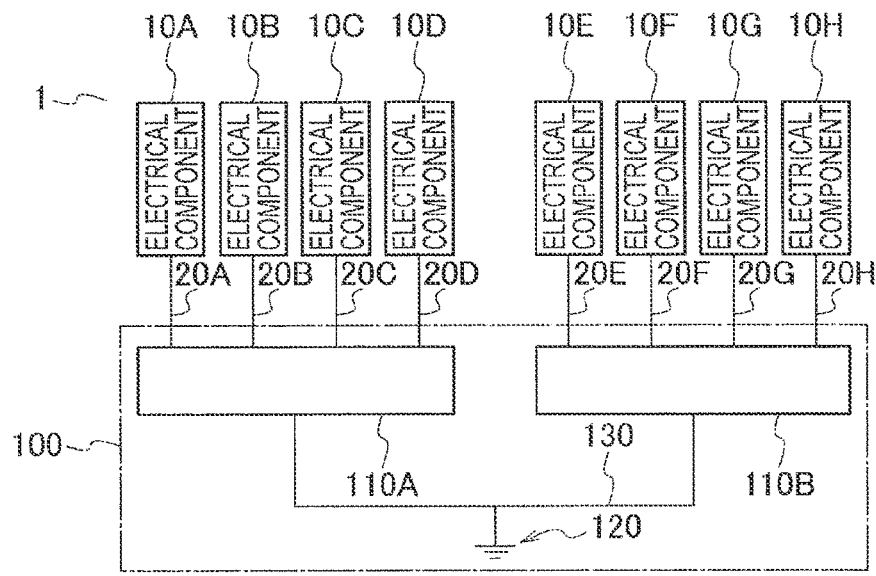
FIG. 1 is a constitutive diagram illustrating electrical components etc. installed in a vehicle, according to a first embodiment.

Ground connection structures according to embodiments of the present invention will be described with reference to drawings.

Note, in descriptions of the drawings, identical or similar elements are indicated with the same or similar reference numerals. However, it should be noted that the drawings are only exemplary, and ratios etc. among respective dimensions are different from actual ratios respectively.

Accordingly, detailed dimensions etc. should be judged in consideration of the descriptions. Additionally, different dimensional relationships or ratios between elements may be included throughout the drawings.

(1) First Embodiment

A ground connection structure according to a first embodiment will be described with reference to the drawings.

(1.1) Schematic Constitution of Vehicle

The schematic constitution of a vehicle 1 using the ground connection structure 100 according to the first embodiment will be described with reference to FIG. 1. It is supposed that the vehicle 1 is an automobile (including an electric car, a hybrid electric car, or the like).

A plurality of electrical components 10A-10H are installed in the vehicle 1. A plurality of grounding wires 20A-20H each including a single core circular wire formed by a core and a covering material are connected to the electrical components 10A-10H, respectively. The plurality of grounding wires 20A-20H are grounded to a body BD of the vehicle 1 by the ground connection structure 100 according to the first embodiment.

Concretely, the plurality of grounding wires 20A-20D connected to the electrical components 10A-10D respectively are collected up into a connection box 110A, while the plurality of grounding wires 20E-20H connected to the electrical components 10E-10H respectively are collected up into a connection box 110B. Then, grounding terminal parts 120 connected to electrically conducting connection parts 130 drawn out from the respective connection boxes 110A, 110B are connected to the body BD of the vehicle 1. In this way, the plurality of electrical components 10A-10H are grounded to the body BD of the vehicle 1.

As the electrical components 10A-10H, the grounding wires 20A-20H, and the connection boxes 110A, 110B are respectively constructed similarly to each other, the electrical components 10A-10H will be simply referred to as "electrical component 10", the grounding wires 20A-20H will be simply referred to as "grounding wire 20", and the connection boxes 110A, 110B will be referred to as "connection box 110" hereinafter.

(1.2) Constitution of Ground Connection Structure

Figure 2:
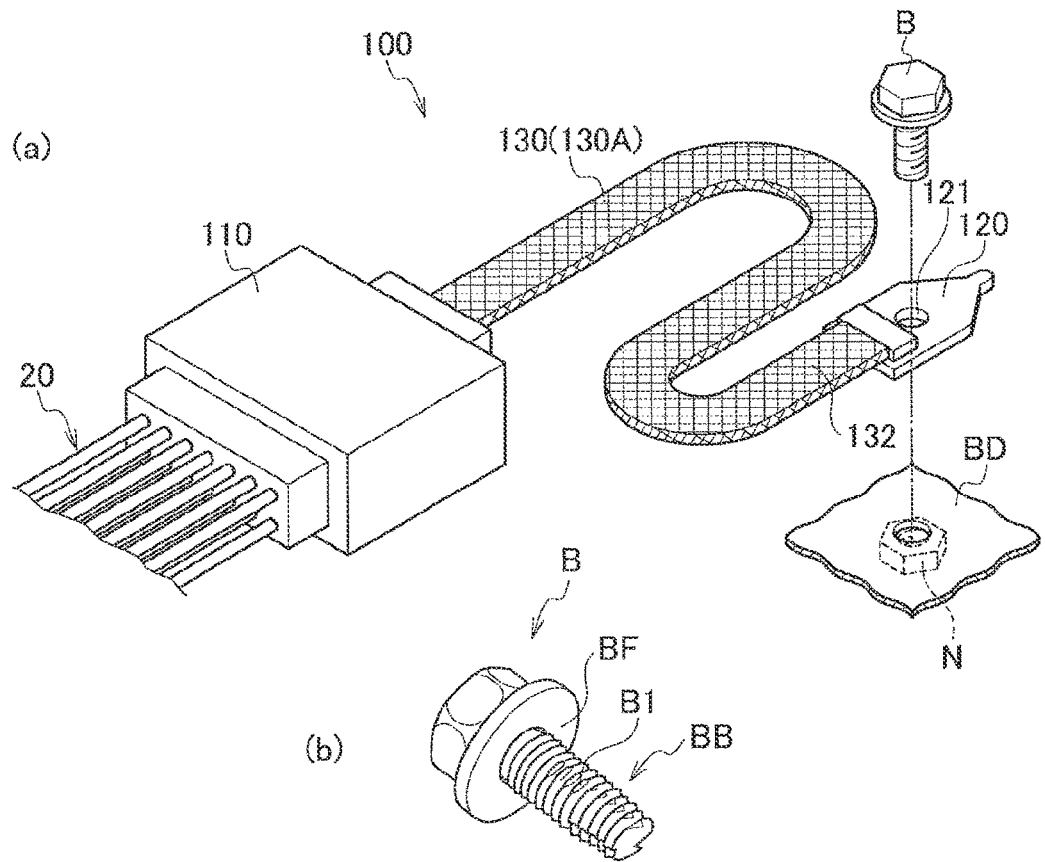
FIG. 2 is a perspective view illustrating a ground connection structure according to the first embodiment.
Figure 3:
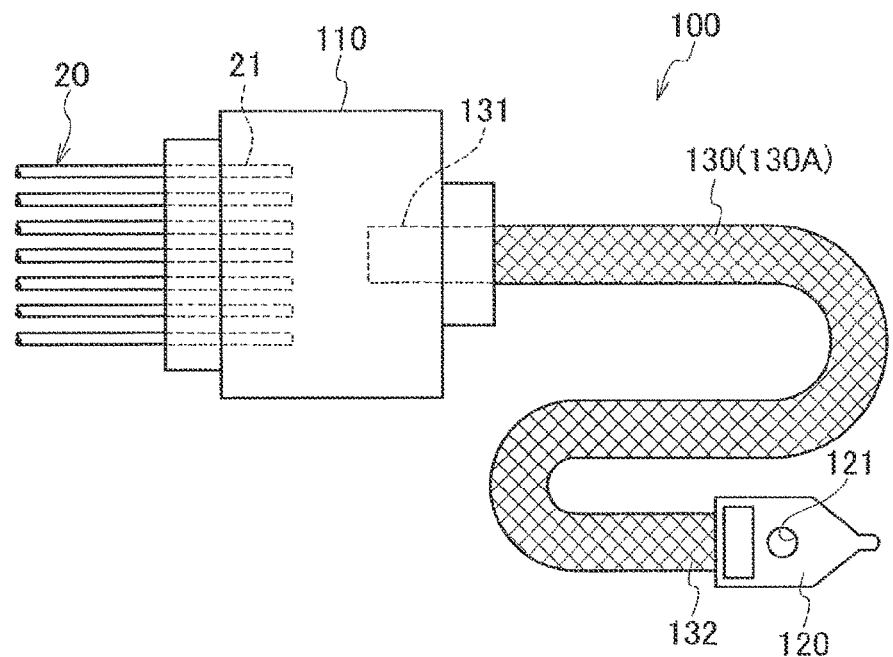
FIG. 3 is a plan view of the ground connection structure according to the first embodiment.

The constitution of the ground connection structure 100 according to the first embodiment will be described with reference to FIGS. 2(a), 2(b), and 3.

The ground connection structure 100 is directed to connect the plurality of grounding wires 20, which are respectively connected to the plurality of electrical components 10 installed in the vehicle 1, to the body BD of the vehicle 1. The ground connection structure 100 includes the connection box 110 (connected part) to which the plurality of grounding wires 20 are connected respectively, the grounding terminal part 120 connected to the body BD of the vehicle 1 in an electrically conducting state and the electrically conducting connection part 130 connecting the connection box 110, and the grounding terminal part 120 in an electrically conducting manner.

The connection box 110 connects the grounding wires 20 and the electrically conducting connection part 130 in an electrically conducting state. One ends 21 of the respective grounding wires 20 and one end 131 of the electrically conducting connection part 130 are fixed to the connection box 110 by pressure bonding, welding, or the like.

The one ends 21 of the respective grounding wires 20 and the one end 131 of the electrically conducting connection part 130 need not necessarily be fixed to the connection box 110 by means of pressure bonding or welding, the grounding wires 20 have only to be connected to the electrically conducting connection part 130 in an electrically conducting state.

The grounding terminal part 120 is connected to the other end 132 of the electrically conducting connection part 130. The grounding terminal part 120 is formed with a circular bolt-insertion hole 121 into which a bolt B (fixing member) used for fixture with the body BD is inserted. The grounding terminal part 120 has only to be connected to the body BD in an electrically conducting state and may be appropriately modified in terms of its size, configuration, and so on.

The bolt B has electrical conductivity and fixes the grounding terminal part 120 to the body BD together with a nut N welded securely to the body BD. As illustrated in FIG. 2(*b*), the bolt B includes a bolt part. BB threadedly engaged with the nut N, and a disc-shaped flange BF for pressing the grounding terminal part 120 onto the side of the body BD. The bolt part BB is formed with a recess part B1 for shaving off a coating (cation coating) of the body BD, an external facing in the nut N, such as anticorrosive.

The electrically conducting connection part 130 is provided between the connection box 110 and the grounding terminal part 120. One end 131 of the electrically conducting connection part 130 is connected to the connection box 110 in an electrically conducting state. The other end 132 of the electrically conducting connection part 130 is connected to the grounding terminal part 120 in an electrically conducting state.

The electrically conducting connection part 130 is formed by a low-inductance material 130A having low inductance. In the first embodiment, there is used, as a member constituting the electrically conducting connection part 130, a low-inductance material 130A whose inductance is lower than inductance of a single-core circular wire whose diameter is established by current capacity based on the plurality of grounding wires 20. That is, the low-inductance material 130A has inductance lower than that of the electrically conducting connection part (single-core circular wire whose diameter is established by current capacity) described in Background Art.

In detail, the low-inductance material 130A is formed by a flat braided wire having flexibility. In the low-inductance material 130A, its cross section perpendicular to an extending direction of the low-inductance material 130A is flat-shaped (including elliptical and rectangular shapes). The low-inductance material 130A may be formed by a flat-shaped conductor in cross section perpendicular to its extending direction, such as flat-shaped wire and busbar, without being limited to the flat braided wire.

(1.3) Comparative Evaluation

The comparative evaluation in case of using the low-inductance material 130A and a known single-core circular wire for the electrically conducting connection part 130 will be described with reference to Table 1.

The low-inductance material 130A according to the first embodiment is formed by a flat braided wire. The low-inductance material 130A is flat-shaped in cross section perpendicular to the extending direction of the low-inductance material 130A. While, the single-core circular wire is formed by a core line and a covering material. The single-core circular wire is circular in cross section perpendicular to its extending direction.

TABLE 1

| line | length [mm] | inductance L [nH] (measured value @ 0.1 MHz) | impedance Z [Ω] (measured value) | | |
|---|---|---|---|---|---|
| | | | @ 0.1 MHz | @ 1 MHz | @ 10 MHz |
| single-core circular wire (5.5 sq.) | 235 | 145 | 0.09 | 0.91 | 9.11 |
| flat braided wire (1.1(t) × 12(w) mm) | 235 | 97 | 0.06 | 0.61 | 6.09 |

When representing the frequency of alternating current by f and the inductance of the electrically conducting connection part 130 by L, then the impedance Z of the electrically conducting connection part 130 is represented by an equation $Z=2\pi f L$. As illustrated in Table 1, when comparing the low-inductance material 130 A (flat braided wire) with the single-core circular wire, it is appreciated that the inductance L gets smaller from 145 nH to 97 nH. Consequently, the impedance Z falls from 0.09Ω to 0.06Ω at frequency of 0.1 MHz, from 0.91Ω to 0.61Ω at frequency of 1 MHz, and from 9.11Ω to 6.09Ω at frequency of 10 MHz. That is, the low-inductance material 130A can reduce its impedance by approximately ⅔ in comparison with the single-core circular wire.

(1.4) Operation and Effects

In the first embodiment, the electrically conducting connection part 130 is formed by the low-inductance material 130A having low inductance, namely, the low-inductance material 130A whose inductance is lower than that of the electrically conducting connection part (single-core circular wire whose diameter is established by current capacity) described in Background Art. Thus, as the impedance can be reduced by the low-inductance material 130A, it is especially possible to realize low impedance against high-frequency AC component. As the low-impedance electrically conducting connection part 130 reduces significantly possibility of potential drop, it is possible to suppress a rising of noise voltage caused by such potential drop, allowing a prevention of noise resulting from such potential rise. As a result, it is possible to prevent noise from having adverse impacts on electrical components installed in a vehicle (i.e. causing the components to be operated unstably or non-functionally).

In the first embodiment, the electrically conducting connection part 130 is provided to connect the connection box 110 and the electrically conducting connection part 130 in an electrically conducting manner. Consequently, when only the grounding wires 20 are routed up to the connection box 110, the electrical conductivity from the connection box 110 to the body BD would be accomplished by routing of the electrically conducting connection part 130 only. Thus, it is possible to ensure the routing capability of the electrically conducting connection part 130.

In the first embodiment, the low-inductance material 130A is flat-shaped in cross section. In the low-inductance material 130A, accordingly, it is possible to make its impedance small in comparison with a single-core circular wire which is circular-shaped in cross section. For this reason, it is particularly possible to realize the low-impedance electrically conducting connection part 130 for high-frequency AC component.

In the first embodiment, the low-inductance material 130A is formed by a flat braided wire. Consequently, due to its superior flexibility, it is possible to improve the routing capability of the electrically conducting connection part 130.

(1.5) Modification

Figure 4:
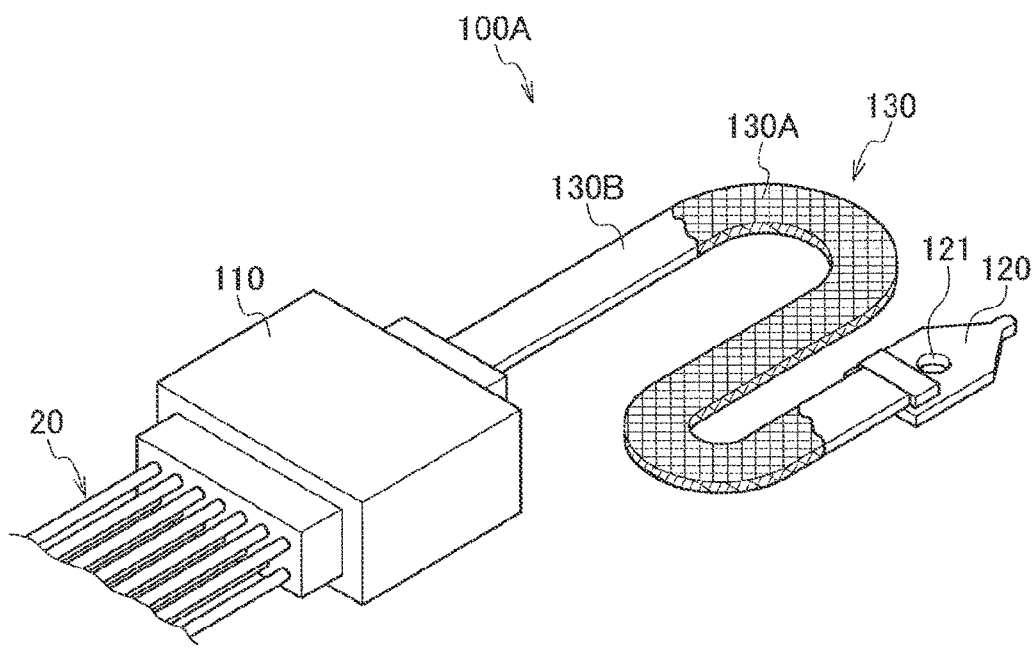
FIG. 4 is a perspective view illustrating a ground connection structure according to a modification of the first embodiment.

A modification of the ground connection structure 100 according to the first embodiment will be described with reference to FIG. 4. Note, elements identical to those of the ground connection structure 100 according to the first embodiment are respectively indicated with the same reference numerals, and the following description is mainly directed against different parts.

In the ground connection structure 100 according to the first embodiment, the electrically conducting connection part 130 consists of only the low-inductance material 130A. In contrast, in a ground connection structure 100A according to the modification, the electrically conducting connection part 130 consists of a low-inductance material 130A and a covering member 130B covering the low-inductance material 130A. For the covering member 130B, there may be used, for example, heat shrinkable tube, light cure resin or the like. Alternatively, the covering member 130B may be provided by die molding of resin, such as vinyl-chloride, elastomer, ethylene-propylene rubber (EPDM), or the like.

Thus, in the electrically conducting connection part 130 of the ground connection structure 100A according to the modification, the low-inductance material 130A is covered with the covering member 130B. Consequently, the low-inductance material 130A can be protected from its deterioration and it is possible to prevent the deterioration of the low-inductance material 130A. For this reason, it is possible to improve the durability the low-inductance material 130A. Also, the covering member 130B has the function of holding the configuration of the low-inductance material 130A in a flat shape.

(2) Second Embodiment

A ground connection structure according to a second embodiment will be described with reference to drawings. Note, elements identical to those of the ground connection structure 100 according to the first embodiment are respectively indicated with the same reference numerals, and the following description is mainly directed against different parts.

(2.1) Constitution of Ground Connection Structure

The constitution of the ground connection structure 100A according to the second embodiment will be described with reference to FIGS. 5 to 9.

Figure 5:
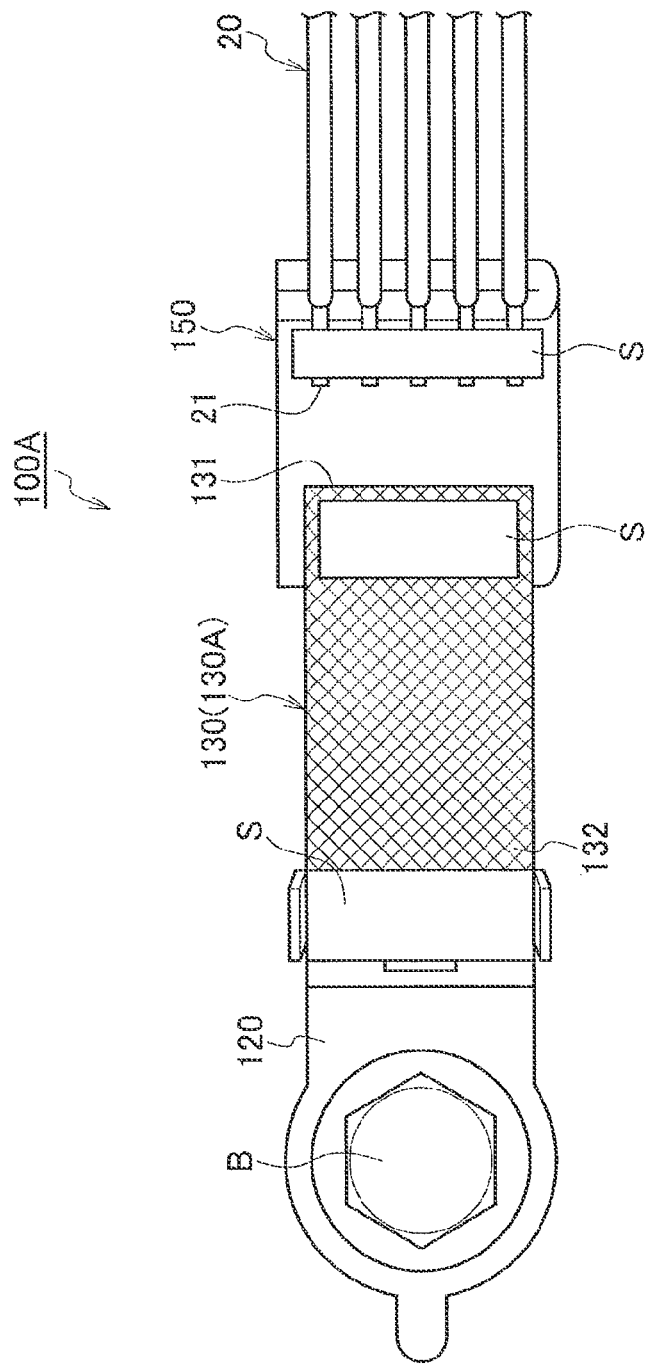
FIG. 5 is a plan view illustrating a ground connection structure according to a second embodiment.
Figure 6:
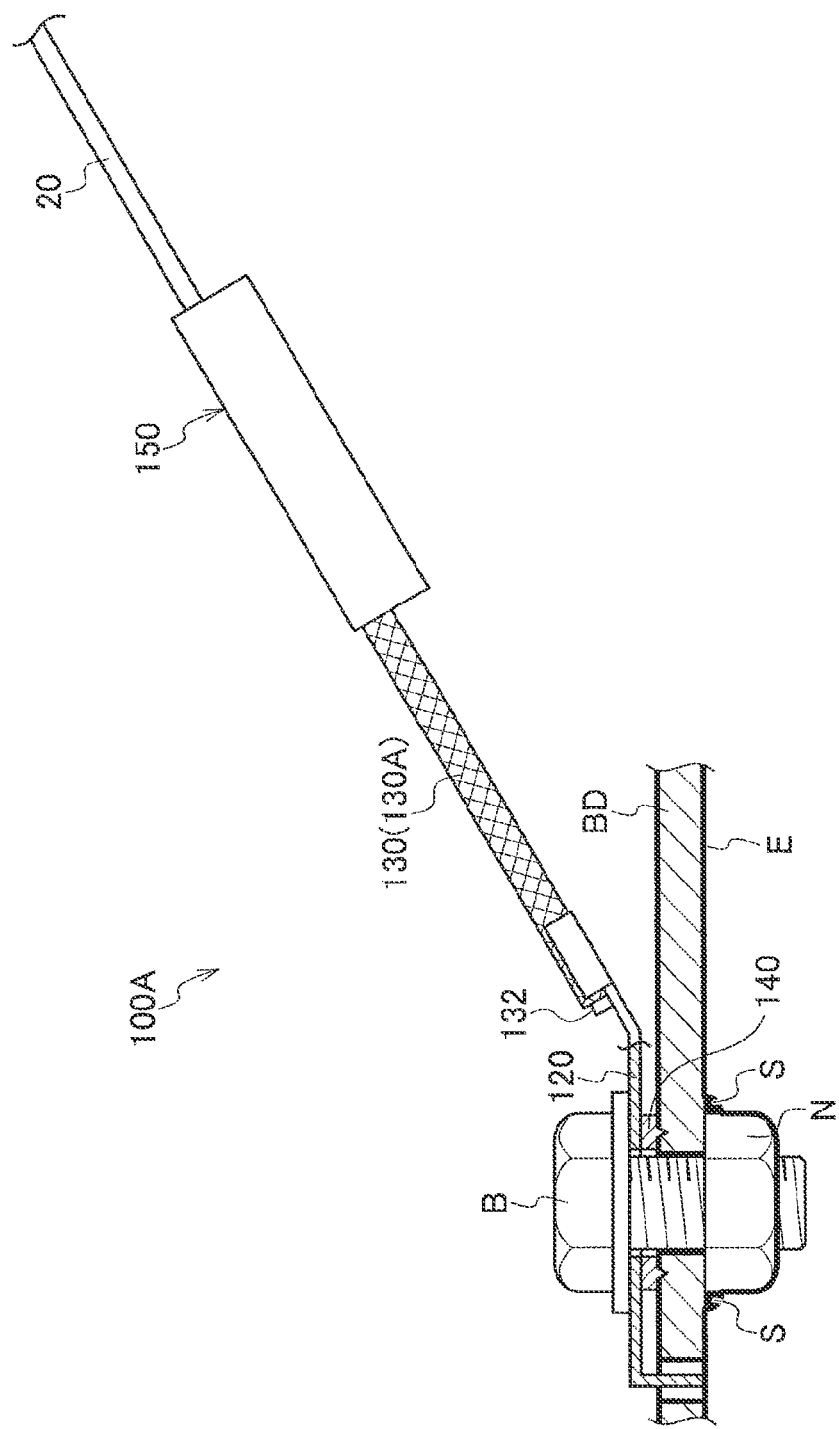
FIG. 6 is a side view illustrating the ground connection structure according to the second embodiment.

As illustrated in FIGS. 5 and 6, the ground connection structure 100A further includes a disc-shaped washer 140 (first fastened member) arranged between the grounding terminal part 120 and the body BD of the vehicle 1. Although the second embodiment will be described on the assumption that the washer 140 is made of iron material, it may be made of other metallic materials, such as copper and aluminum, without being limited to iron material.

As illustrated in FIGS. 7(*a*) to 7(*c*), the washer 140 is formed with a circular bolt-insertion hole 141 into which the bolt B is inserted. The washer 140 has a plurality of (six in the figure) projections 142 projecting toward the side of the body BD. That is, the projections 142 are formed on a washer's surface where the washer 140 butts against the body BD.

The projections 142 are provided independently of the washer 140. In detail, each of the projections 131 includes a base 142A fixed to a groove part 143 of the washer 140 and a tip part 142B formed in succession to the base 142A so as to face toward a tip sharply (conically). A clearance 144 is defined between the tip part 142B and the groove part 143 of the washer 140.

When the washer 140 is tightened by the bolt B and the nut N, the projections 142 come into contact with the body BD while shaving off an external facing E of the body BD (shown with thick line of FIG. 6) such as coating (cation coating) and anticorrosive. The so-shaved external facing E of the body BD enters the clearances 144. For this reason, the conductivity between the washer 140 and the body BD can be ensured. Preferably, the washer 140 is subjected to quenching after forming the projections 142 in order to increase its hardness.

The ground connection structure 100A includes, in place of the connection box 110 described in the first embodiment, a connection fitting 150 (connected part) allowing the plurality of grounding wires 20 to be connected to the electrically conducting connection part 130 in an electrically conducting state.

As illustrated in FIGS. 8 and 9, the connection fitting 150 connects the plurality of grounding wires 20 and the electrically conducting connection part 130 in an electrically conducting state. The connection fitting 150 is formed by folding a long plate (metallic material) along a folding center line WL.

The connection fitting 150 is formed with wire connection grooves 151 for connection with the plurality of grounding wires 20 and a connection-part connection groove 152 for connection with the electrically conducting connection part 130.

The grounding wires 20 are positioned since respective one ends 21 of the grounding wires 20 are inserted into the respective wire connection grooves 151. The electrically conducting connection part 130 is positioned since one end 131 of the electrically conducting connection part 130 is inserted into the connection-part connection groove 152. Then, as illustrated in FIGS. 9(*a*) and 9(*b*), the one ends 21 of the grounding wire 20 are fixed to the wire connection grooves 151 by resistance welding S. Similarly, the one end 131 of the electrically conducting connection part 130 is fixed to the connection-part connection groove 152 by resistance welding S.

Note, resistance welding S means a technique of connecting an object to be welded (the grounding wires 20 and the electrically conducting connection part 130) to another element by pressurizing the object at the same time of melting the object with use of Joule heat generated by applying electrical current to the object.

In the second embodiment, the other end 132 of the electrically conducting connection part 130 is also fixed to the grounding terminal part 120 by resistance welding S (see FIG. 5). Also, the nut N is fixed to the body BD by resistance welding S (see FIG. 6). That is, respective connection parts in the ground connection structure 100A are all secured with use of resistance welding S.

(2.2) Operation and Effects

In the second embodiment, the washer 140 includes the projections 142 projecting toward the side of the body BD. As the projections 142 shave off the external facing E of the body BD such as coating (cation coating) and anticorrosive, the conductivity between the washer 140 and the body BD is improved. Comparing with a case that the external facing E of the body BD is not shaved off, therefore, the electrical resistance between the washer 140 and a base metal of the body BD (around the bolt B) becomes reduced and particularly, the electrical resistance against alternating current component becomes lower. Thus, it is possible to prevent noise voltage from being elevated by the action of a potential drop caused around the bolt B and also possible to suppress noise derived from a potential rise.

For instance, in case of using the low-inductance material 130A having 20 mm in width, 200 mm in length and 14 mm$^2$ in cross-section area, the result was that the electrical resistance of the low-inductance material 130A was 0.33 mΩ, while the electrical resistance between the washer 140 and the body BD was approximately 0.4-0.6 mΩ. That is, as the electrical resistance around the bolt B is reduced to about 0.5 mΩ, the potential of the bolt B can be approximated to the potential of the body BD. Therefore, it is possible to suppress noise derived from a potential rise.

In the second embodiment, each connection part in the ground connection structure 100A allowing the passage of current is secured by resistance welding S. Consequently, the potential difference among respective connection parts in the ground connection structure 100A allowing the passage of current is reduced to enable current interference from the grounding wires 20 up to the electrically conducting connection part 130 to be reduced. For this reason, it is possible to establish a potential equalization between the connection fitting 150 and the body BD, effecting similar grounding performance as the case of directly connecting the plurality of grounding wires to the body BD like the ground connection structure in the first conventional example described in Background Art.

(2.3) Modification

Figure 10:
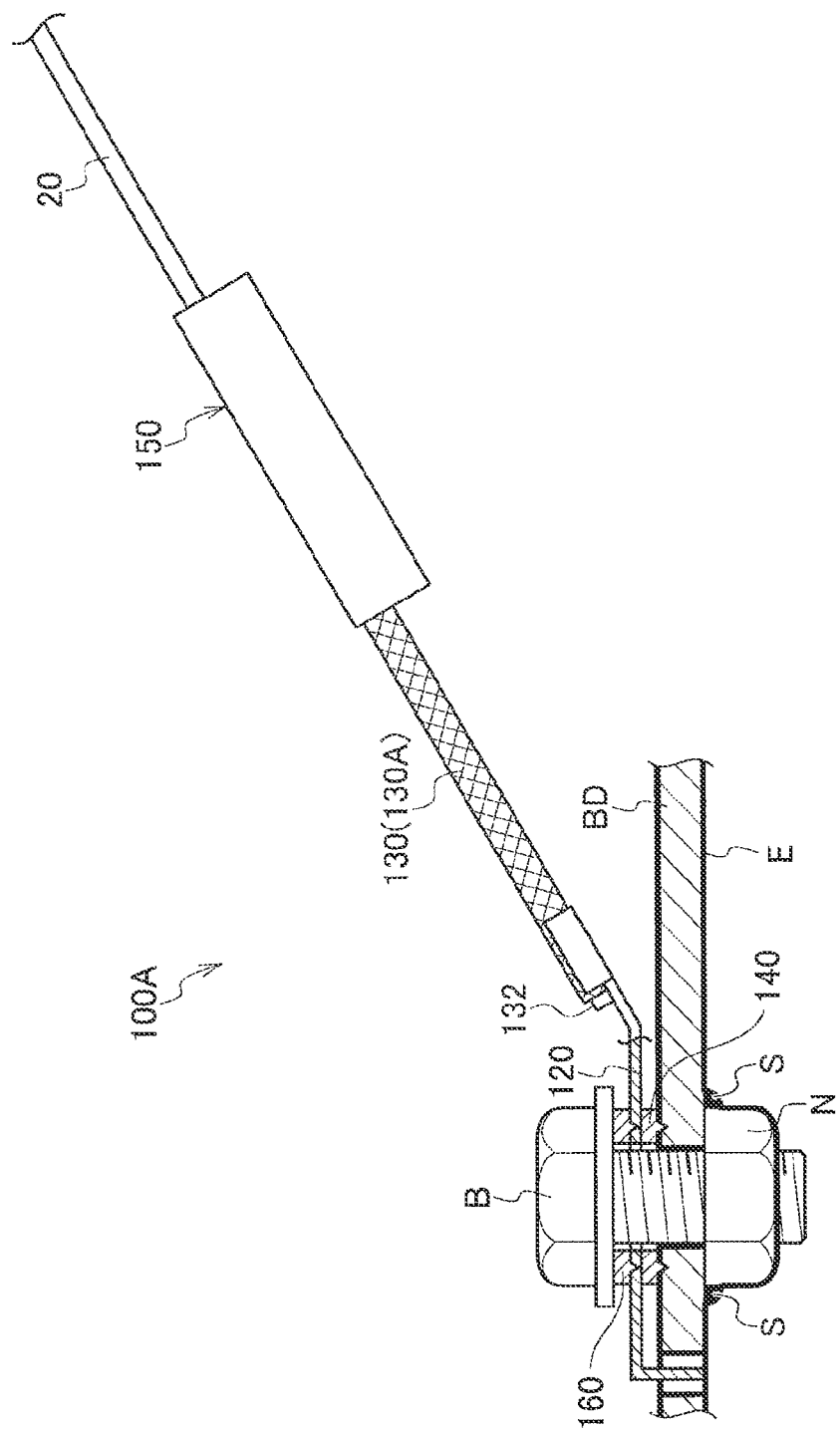
FIG. 10 is a side view illustrating a ground connection structure according to a modification of the second embodiment.

A modification of the ground connection structure 100A according to the second embodiment will be described with reference to FIG. 10. Note, elements identical to those of the ground connection structure 100A according to the second embodiment are respectively indicated with the same reference numerals, and the following description is mainly directed against different parts.

In the second embodiment, the washer 140 is arranged between the grounding terminal part 120 and the body BD of the vehicle 1. In contrast, the ground connection structure 100A according to the modification further includes a disc-shaped washer 160 arranged between the bolt B (fixing member) and the grounding terminal part 120, in addition to the washer 140 described in the second embodiment. The constitution of the washer 160 is similar to that of the washer 140.

In addition to the operation and effect of the second embodiment, the conductivity between the washer 160 and the grounding terminal part 120 can be ensured in the modification to enable the grounding terminal part 120 to be grounded to the body certainly.

(3) Third Embodiment

A ground connection structure according to a third embodiment will be described with reference to drawings. Note, elements identical to those of the ground connection structures 100 and 100A according to the first and second embodiments mentioned above are respectively indicated with the same reference numerals, and the following description is mainly directed against different parts.

(3.1) Constitution of Ground Connection Structure

The constitution of a ground connection structure 100B according to the third embodiment will be described with reference to FIGS. 11 to 14.

Figure 11:
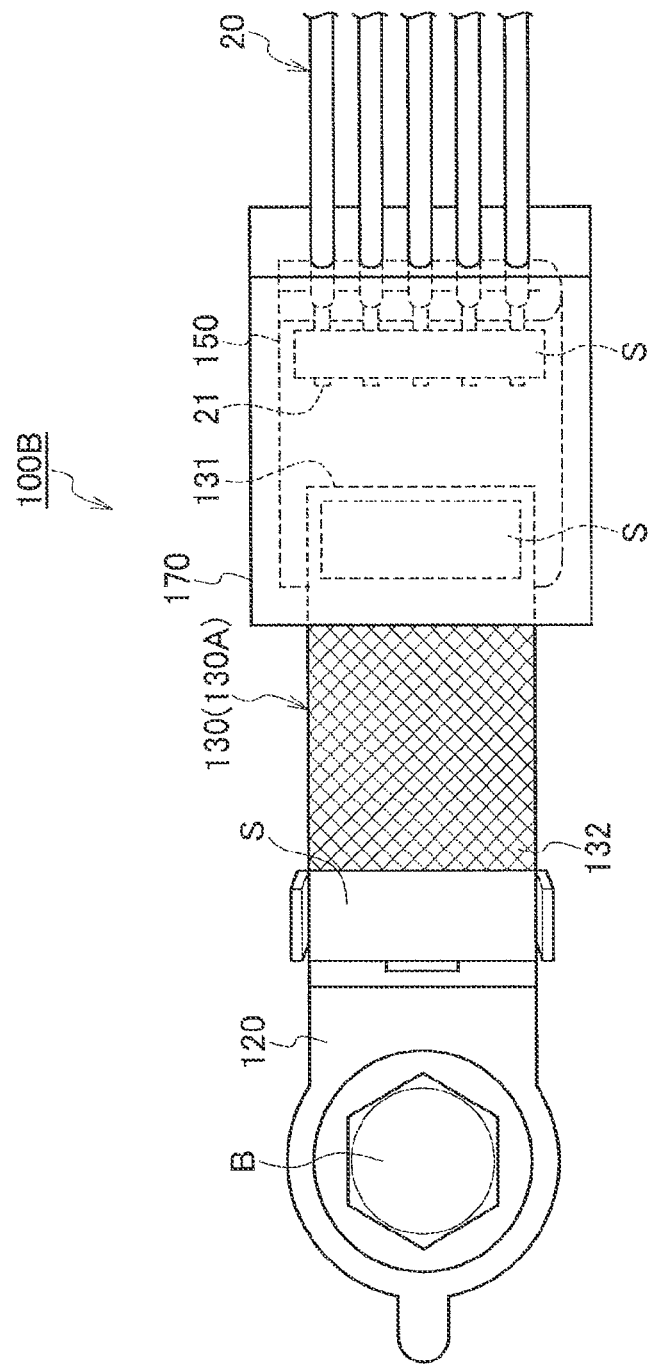
FIG. 11 is a plan view illustrating a ground connection structure according to a third embodiment.
Figure 12:
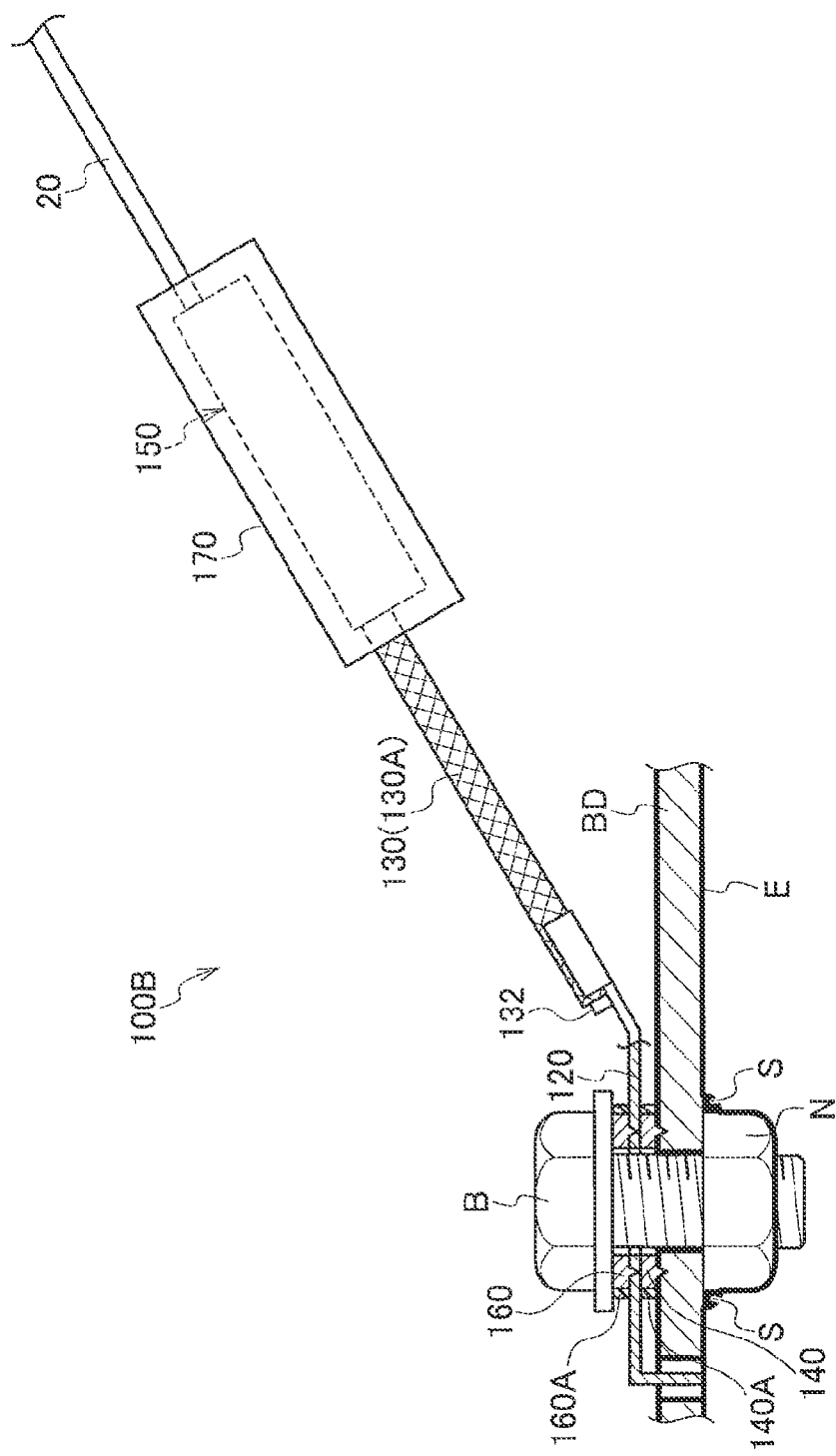
FIG. 12 is a side view illustrating the ground connection structure according to the third embodiment.

As illustrated in FIGS. 11 and 12, the ground connection structure 100B includes the washers 140, 160 described in the second embodiment.

As illustrated in FIG. 13, the washer 140 is provided, on its outer periphery, with a waterproof packing 140A (first waterproof member) for preventing an invasion of liquid pointing toward the inner circumferential side of the washer 140 (i.e. side of the bolt insertion hole 141 or the projections 142). The waterproof packing 140A is made of silicone rubber or the like.

The constitution of the washer 160 is also similar to that of the washer 140. That is, as illustrated in FIG. 12, the washer 160 is also provided, on its outer periphery, with a waterproof packing 160A (second waterproof member) for preventing an invasion of liquid pointing toward the inner circumferential side of the washer 160.

Figure 14:
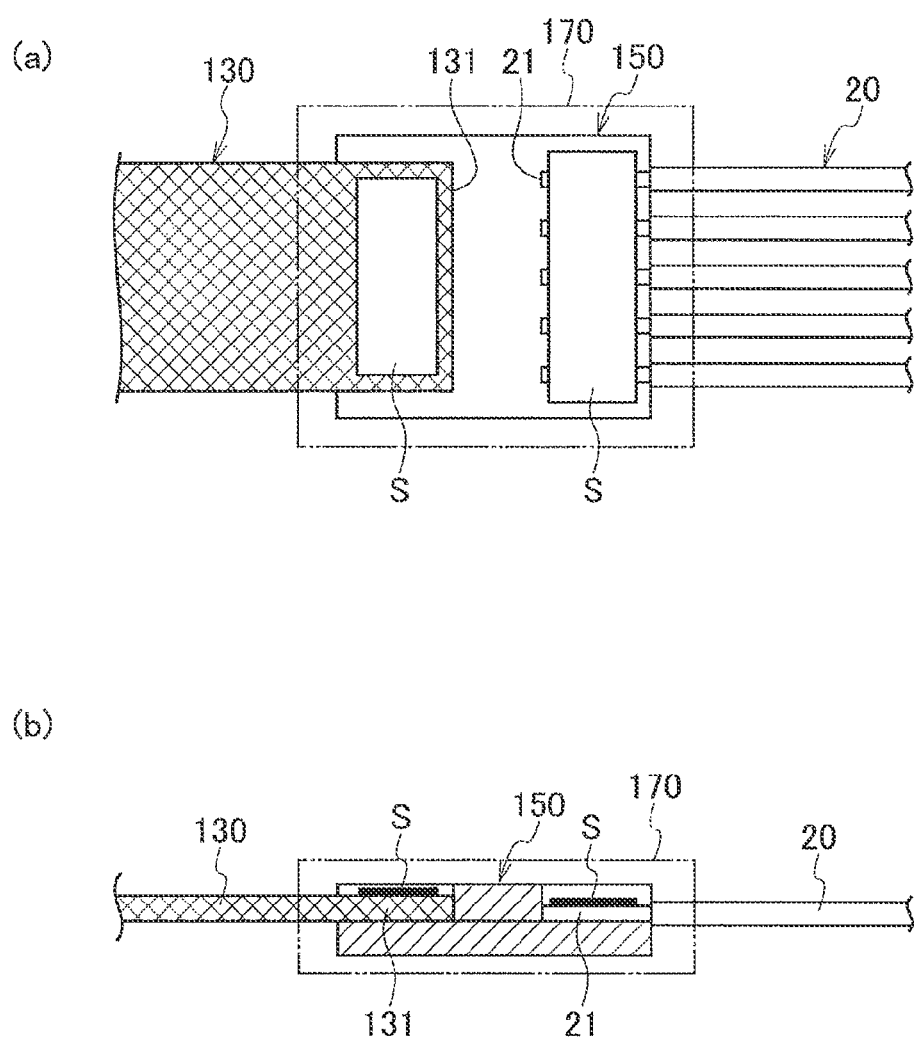
FIG. 14(a) is a plan view illustrating a connection fitting according to the third embodiment.
FIG. 14(b) is a sectional view illustrating the connection fitting according to the third embodiment.

In the ground connection structure 100B, the connection fitting 150 is covered with a sealant 170 made of resin. In detail, as illustrated in FIGS. 11, 12 and 14, the vicinity of the connection fitting 150 is covered with the sealant 170 under condition that the grounding wires 20 are fixed to the wire connection grooves 151 by the resistance welding S and the electrically conducting connection part 130 is fixed to the connection-part connection groove 152 by the resistance welding S.

(3.2) Operation and Effects

In the third embodiment, the washer 140 is provided with the waterproof packing 140A. Consequently, there is no possibility that liquid, such as water, invades the inner circumferential side of the washer 140, and it is possible to prevent liquid from adhering to the washer's parts where the external facing E of the body BD such as coating (cation coating) and anticorrosive have been shaved off by the projections 142. For this reason, it is possible to improve the durability of the external facing E of the body BD.

In the third embodiment, the washer 160 is provided with the waterproof packing 160A. Consequently, there is no possibility that liquid, such as water, invades the inner circumferential side of the washer 160, and it is possible to prevent liquid from adhering to its portions in contact with the bolt B and the grounding terminal part 120. Therefore, it is possible to suppress the occurrence of electric corrosion (ion-oxidation) despite the occurrence of a potential difference at the bolt B or the grounding terminal part 120. As a result, there is less possibility of a loose bolt B or a lifted pole due to corrosion, so that the bolt B can be prevented from dropping out. Additionally, there is no possibility of aged deterioration about the bolt B since it is not corroded and therefore, it is possible to realize the potential equalization between the electrically conducting connection part 130 and the body BD.

In the third embodiment, the connection fitting 150 is covered with the sealant 170. Thus, it is possible to prevent liquid from invading not only the inside of the connection fitting 150 but also the inside of the grounding wires 20 (i.e. core lines inside the covering material), allowing a suppression of the occurrence of electric corrosion (ion-oxidation) inside the connection fitting 150 and the grounding wires 20.

The third embodiment has been described on the assumption that the ground connection structure 100B includes the washers 140, 160. It is not limited to this but the same structure may include only the washer 140. Additionally, the connection fitting 150 does not always have to be covered with the sealant 170.

(4) Fourth Embodiment

A ground connection structure according to a fourth embodiment will be described with reference to drawings. Note, elements identical to those of the ground connection structures 100, 100A, 100B according to the first, second and third embodiments mentioned above are respectively indicated with the same reference numerals, and the following description is mainly directed against different parts.
(4.1) Constitution of Ground Connection Structure The constitution of the ground connection structure 100C according to the fourth embodiment will be described with reference to FIGS. 15 and 16.

Figure 15:
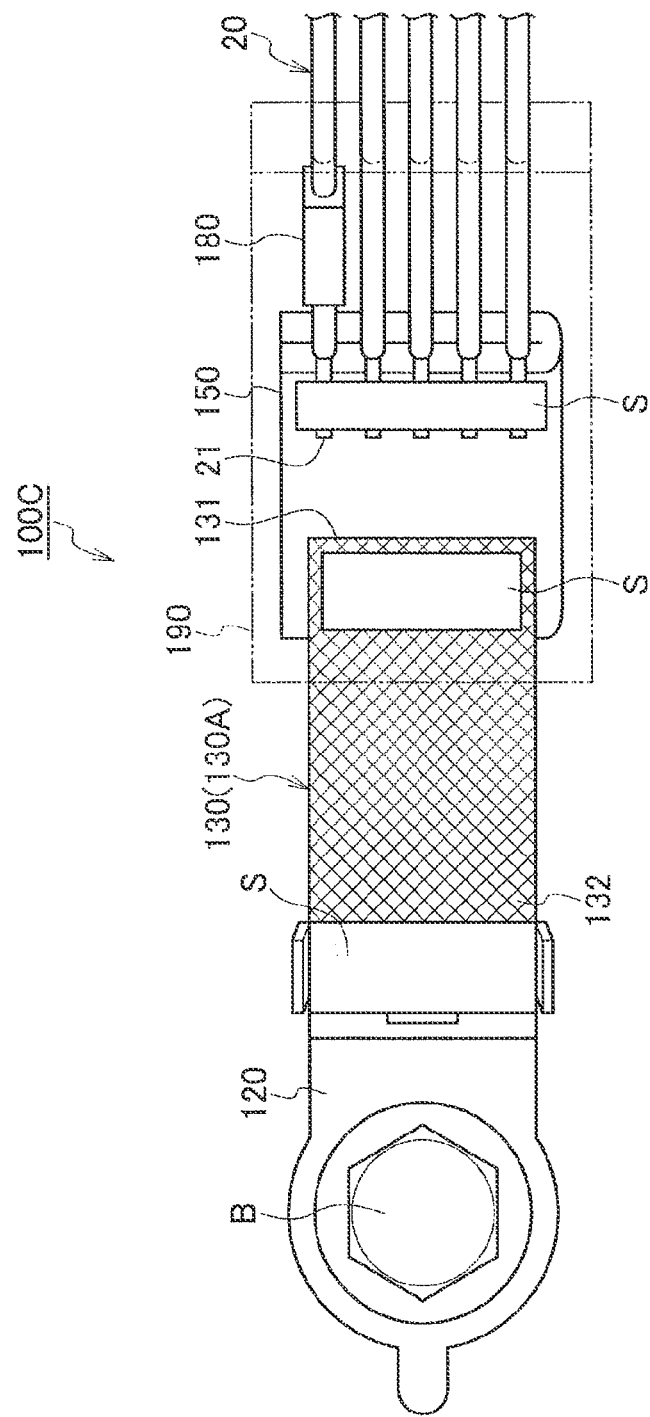
FIG. 15 is a plan view illustrating a ground connection structure according to a fourth embodiment.
Figure 16:
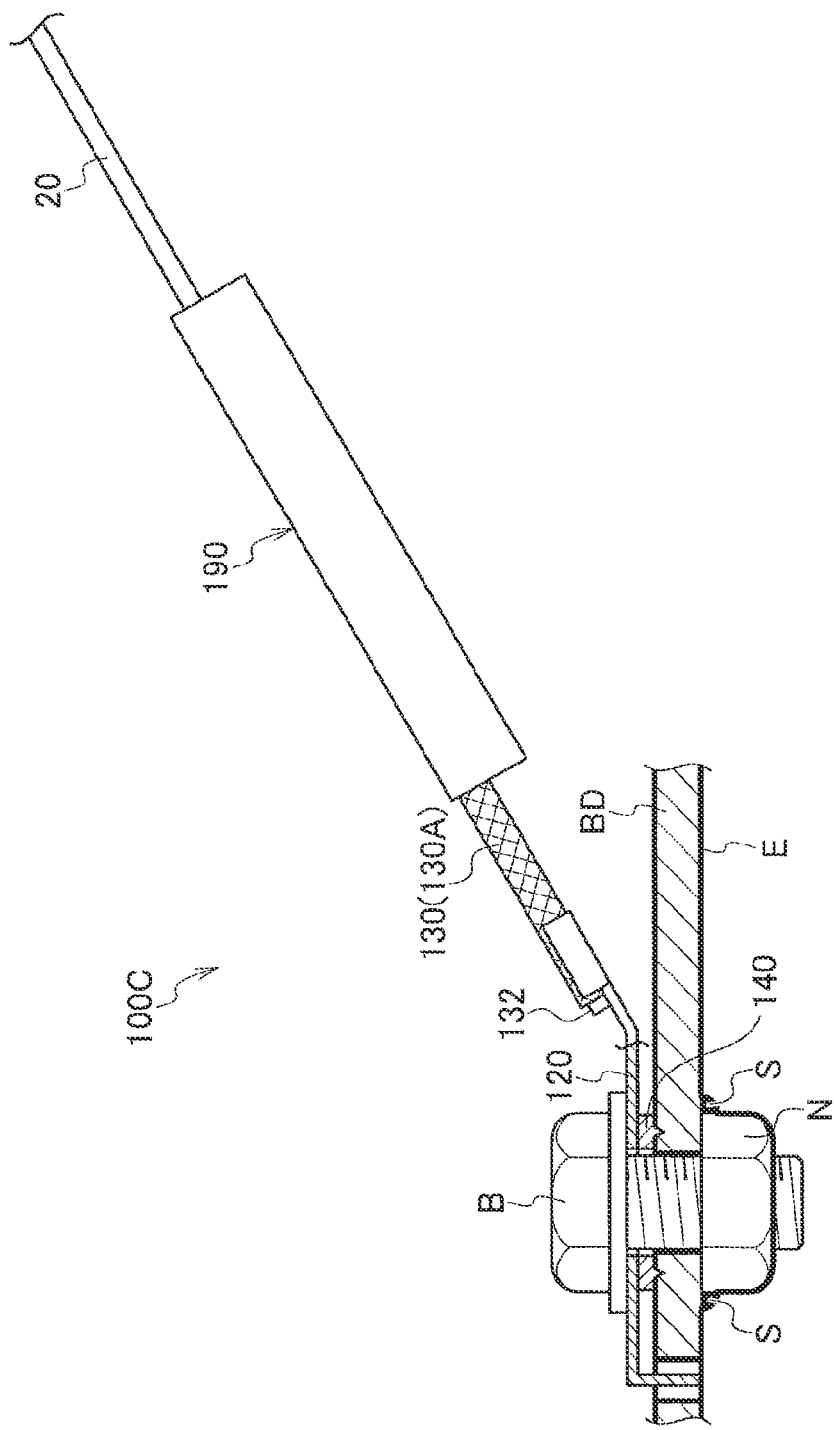
FIG. 16 is a side view illustrating the ground connection structure according to the fourth embodiment.

The ground connection structure 100C includes at least one ferrite 180 (magnetic material) attached to at least one of the plurality of grounding wires 20 (e.g. an uppermost grounding wire 20 in FIG. 15).

The ferrite 180 can absorb high-frequency noise. The ferrite 180 is attached to the side of one end 21 of one of the grounding wires 20 to be regarded as a noise generation source in the grounding wires 20. Note, the wire 20 to be regarded as the noise generation source corresponds to a wire generating the largest high-frequency noise, a wire that is the most frequent in the occurrence of noise, a wire connected to an electrical component 10 operated at the highest voltage, and so on.

The fourth embodiment has been described on the assumption that the ferrite 180 is attached to only the grounding wire 20 regarded as the noise generation source. It is not limited to this but the ferrite 180 may be attached to all of the grounding wires 20.

The ground connection structure 100C further includes a casing 190 made of resin and enclosing the plurality of grounding wires 20, the connection fitting 150, and the ferrite 180. Note, the ground connection structure 100C does not always have to include the casing 190 and therefore, the former may be provided with no casing.
(4.2) Operation and Effects In the fourth embodiment, the ground connection structure 100C includes the ferrite 180 as magnetic material attached to the grounding wire 20 regarded as the noise generation source in the plurality of grounding wires 20. Consequently, it is possible to prevent high-frequency current from entering the connection fitting 150 and also possible to suppress a potential difference in the connection fitting 150. For this reason, it is possible to suppress a potential rise in the connection fitting 150 and make its potential closer to the potential of the body BD (that is, an establishment of the potential equalization between the connection fitting 150 and the body BD). Thus, the noise derived from a potential rise can be suppressed.

In the fourth embodiment, the casing 190 encloses the plurality of grounding wires 20, the connecting fitting 150, and the ferrite 180. Consequently, it becomes easy to prevent liquid from invading not only the insides of the connection fitting 150 and the ferrite 180 but also the inside of the grounding wires 20 (i.e. core lines inside the covering material), allowing a suppression of the occurrence of electric corrosion (ion-oxidation) inside the connection fitting 150, the ferrite 180 and the grounding wires 20.

(5) Other Embodiments

Although the content of the invention has been disclosed through the embodiments as mentioned above, it should not be understood that the invention is limited by the descriptions and the drawing forming the invention in part. From this disclosure, various alternatives, embodiments and operation techniques will be obvious to those skilled in the art.

For instance, the connected part has been described in the form of the connection box 110 or the connection fitting 150. It is not limited to these representatives but the connected part has only to be constructed so as to hold the plurality of grounding wires 20 collectively.

Further, as the grounding terminal part 120, it has only to be connected to the body BD in an electrically conducting state and, of course, it may be formed with any constitution and profile besides the constitutions and profiles described in the respective embodiments. Additionally, the embodiments have been described on the assumption that means for fixing the grounding terminal part 120 to the body BD includes the bolt B and the nut N. It is not limited to this combination but it may be replaced with another element capable of fixing the grounding terminal part 120 to the body BD in an electrically conducting state.

Still, the electrically conducting connection part 130 (the low-inductance material 130A) according to the respective embodiments can be advantageously used as, for example, a battery-ground wire for connecting a negative terminal of a battery installed in a vehicle to the body of the vehicle. If adopting the electrically conducting connection part 130 for a battery-ground wire, it is preferable that the low-inductance material 130A is covered with the covering member 130B and also preferable that a terminal like the grounding terminal part 120 is connected to the one end 131 of the electrically conducting connection part 130.

Note, it is a matter of course that different constitutions described in the first to fourth embodiments may be combined to provide the ground connection structure of the present invention.

Thus, it is a matter of course that the present invention may encompass various embodiments which are not described herein. Accordingly, the technical scope of the present invention is defined by only all matters specifying the invention, which are related to reasonable claims from the above explanations.

What is claimed is:
1. A ground connection structure, comprising:
  a plurality of grounding wires being respectively connected to a plurality of electrical components installed in a vehicle;
  a connected part to which the grounding wires are electrically interconnected;
  a grounding terminal part connected to a body of the vehicle in an electrically conducting state; and
  an electrically conducting connection part having one end in and connected to the connected part and the other end connected to the grounding terminal part to connect the connected part and the grounding terminal part in an electrically conducting manner, wherein
  the electrically conducting connection part is made of a low-inductance material having lower inductance than a single-core circular wire having a diameter established by current capacities of the plurality of grounding wires, the connected part is arranged between the grounding wires and the electrically conducting connection part;

the connected part is a connection box into which one end of the electrically conducting connection part and one end of each of the plurality of grounding wires are inserted, the one end of the electrically conducting connection part is welded via a first weld to a first portion on an inside of the connection box, and the one end of each of the plurality of grounding wires is welded via a second weld to a second portion on the inside of the connection box.

2. The ground connection structure according to claim 1, wherein
the low-inductance material is flat-shaped in cross section perpendicular to an extending direction of the low-inductance material.

3. The ground connection structure according to claim 1, wherein
the low-inductance material is formed by a flat braided wire.

4. The ground connection structure according to claim 1, wherein
the low-inductance material is covered with a covering member made of resin.

5. The ground connection structure according to claim 1, wherein the electrically conducting connection part comprises a flat cable electrically interconnecting the connected part and the grounding wires connected to the grounding terminal part, and
wherein the flat cable is one of elliptical and rectangular in cross section perpendicular to an extension of the flat cable from the connected part to the grounding terminal part.

6. The ground connection structure according to claim 5, wherein the low inductance is lower in inductance than an inductance of a single-core circular cable having a same length as the flat cable in a case in which the single-core circular cable were interconnected in place of the flat cable.

7. The ground connection structure according to claim 1, further comprising:

a disc shaped washer comprising a plurality of projections biting into the body, wherein the grounding terminal part is connected to the body by the disc shaped washer such that a portion of the body is shaved off by connection of the grounding terminal part to the body.

8. The ground connection structure according to claim 7, wherein the disc shaped washer provides a waterproof connection to the body.

9. The ground connection structure according to claim 1, wherein the connected part comprises a first groove and a plurality of second grooves, wherein the one end of the electrically conducting connection part is inserted into the first groove, and wherein each of the plurality of grounding wires is inserted into a respective one of the plurality of second grooves.

10. The ground connection structure according to claim 9, wherein the one end of the electrically conducting connection part is inserted into the first groove and is welded into the first groove by the first weld, and wherein each of the plurality of grounding wires is inserted into a respective one of the plurality of second grooves and is welded into the second grooves by the second weld.

11. The ground connection structure according to claim 1, wherein each of the plurality of grounding wires is inserted into the connected part, and wherein at least one of the plurality of grounding wires comprises a ferrite attached to the at least one of the plurality of grounding wires at a position outside of the connected part.

12. The ground connection structure according to claim 1, wherein the low-inductance material comprises a plurality of wires that are braided with each other from in the connected part and to the grounding terminal, wherein the low-inductance material is covered by a covering member configured to hold the low-inductance material in a flat shape, and wherein the low-inductance material and the grounding wires are welded to the connected part.

* * * * *